(12) United States Patent
Talgorn et al.

(10) Patent No.: US 10,456,977 B2
(45) Date of Patent: Oct. 29, 2019

(54) PRINTING HEAD, PRINTING APPARATUS, PRINTING METHOD AND PRINTED ARTICLE

(71) Applicant: SIGNIFY HOLDING B.V., Eindhoven (NL)

(72) Inventors: Elise Claude Valentine Talgorn, Eindhoven (NL); Rifat Ata Mustafa Hikmet, Eindhoven (NL); Johan Lub, Eindhoven (NL); Ties Van Bommel, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 95 days.

(21) Appl. No.: 15/523,496

(22) PCT Filed: Nov. 17, 2015

(86) PCT No.: PCT/EP2015/076731
§ 371 (c)(1),
(2) Date: May 1, 2017

(87) PCT Pub. No.: WO2016/083181
PCT Pub. Date: Jun. 2, 2016

(65) Prior Publication Data
US 2017/0312985 A1 Nov. 2, 2017

(30) Foreign Application Priority Data
Nov. 27, 2014 (EP) ..................... 14195050

(51) Int. Cl.
*B29C 64/209* (2017.01)
*B33Y 80/00* (2015.01)
(Continued)

(52) U.S. Cl.
CPC .......... *B29C 64/209* (2017.08); *B29C 64/106* (2017.08); *B29C 64/112* (2017.08);
(Continued)

(58) Field of Classification Search
CPC ... B29C 64/106; B29C 64/165; B29C 64/188; B29C 64/209; B29C 64/241; B29C 64/336
(Continued)

(56) References Cited

U.S. PATENT DOCUMENTS

| 2005/0074596 A1 | 4/2005 | Nielsen et al. |
| 2010/0009133 A1 | 1/2010 | Chait |

(Continued)

FOREIGN PATENT DOCUMENTS

| FR | 2359912 A1 | 2/1978 |
| RU | 2294839 C2 | 3/2007 |

(Continued)

OTHER PUBLICATIONS

Oxford Dictionaries, https://en.oxforddictionaries.com/definition/us/polygon, accessed Dec. 20, 2018. (Year: 2018).*
(Continued)

*Primary Examiner* — Joseph S Del Sole
*Assistant Examiner* — Lawrence D. Hohenbrink, Jr.
(74) *Attorney, Agent, or Firm* — Stephen M. Kohen

(57) ABSTRACT

A printing head (100) for a 3-D printing device is disclosed that comprises a nozzle (110) arranged to print a layer (140) of a printing material on a receiving surface (130) and a texturing member (120) arranged to texture the layer or the receiving surface during printing of said layer. The nozzle comprises an outlet including the texturing member (120) and the outlet is shaped to form protrusions (145) extending from a main surface of the layer (140) for interlocking with a subsequent layer. The texturing member ensures that (Continued)

contacting layers formed with the printing head exhibit improved adhesion due to the increased contact surface area between the layers. This yields stronger 3-D articles printed in this manner. A printing apparatus including the printing head, a printing method and an article printed in accordance with the printing method are also disclosed.

18 Claims, 6 Drawing Sheets

(51) Int. Cl.
    *B33Y 10/00*     (2015.01)
    *B33Y 30/00*     (2015.01)
    *B29C 64/106*     (2017.01)
    *B29C 64/20*     (2017.01)
    *B29C 64/112*     (2017.01)
    *B29C 64/188*     (2017.01)
    *B29C 64/165*     (2017.01)
    *B29C 64/336*     (2017.01)
    *B29C 64/241*     (2017.01)

(52) U.S. Cl.
    CPC .......... *B29C 64/165* (2017.08); *B29C 64/188* (2017.08); *B29C 64/20* (2017.08); *B29C 64/336* (2017.08); *B33Y 10/00* (2014.12); *B33Y 30/00* (2014.12); *B33Y 80/00* (2014.12); *B29C 64/241* (2017.08)

(58) Field of Classification Search
    USPC .................................. 264/255, 308; 425/375
    See application file for complete search history.

(56) References Cited

U.S. PATENT DOCUMENTS

| | | | |
|---|---|---|---|
| 2010/0215856 A1* | 8/2010 | Kritchman | B33Y 10/00 427/277 |
| 2010/0327479 A1 | 12/2010 | Zinniel et al. | |
| 2014/0134335 A1 | 5/2014 | Pridoehl et al. | |
| 2015/0367375 A1* | 12/2015 | Page | B33Y 30/00 118/697 |
| 2016/0288395 A1* | 10/2016 | Shen | B29C 47/802 |

FOREIGN PATENT DOCUMENTS

| | | |
|---|---|---|
| RU | 2471627 C2 | 1/2013 |
| WO | WO2001053105 A2 | 7/2001 |
| WO | WO2004065707 A2 | 8/2004 |

OTHER PUBLICATIONS

Study.com, https://study.com/academy/lesson/what-is-a-polygon-definition-shapes-angles.html, accessed Dec. 20, 2018. (Year: 2018).*

* cited by examiner

PRINTING HEAD, PRINTING APPARATUS, PRINTING METHOD AND PRINTED ARTICLE

CROSS-REFERENCE TO PRIOR APPLICATIONS

This application is the U.S. National Phase application under 35 U.S.C. § 371 of International Application No. PCT/EP2015/076731, filed on Nov. 17, 2015, which claims the benefit of European Patent Application No. 14195050.1, filed on Nov. 27, 2014. These applications are hereby incorporated by reference herein.

FIELD OF THE INVENTION

The present invention relates to a printing head for a 3-D printing apparatus, comprising a nozzle arranged to print a layer of a printing material on a receiving surface.

The present invention further relates to a 3-D printing apparatus including such a printing head.

The present invention yet further relates to a printing method using such a printing apparatus.

The present invention still further relates to an article printed by such a printing method.

BACKGROUND OF THE INVENTION

Additive manufacturing, sometimes also referred to as 3-D printing, is a technique in which an article is formed using a 3-D printing apparatus that builds up the article in three dimensions in a number of printing steps that are usually controlled by a 3-D computer model, e.g. 3-D CAD data, of the article to be manufactured. For example, a sliced 3-D model of the article may be provided in which each slice is recreated by the printing apparatus in a discrete printing step. To this end, the printing apparatus may deposit a plurality of layers of one or more printing materials, which layers may be cured or otherwise hardened after deposition, e.g. using a laser to induce the curing process. An example of such a printing apparatus is disclosed in US 2010/0327479 A1.

Additive manufacturing techniques are rapidly gaining popularity because of their ability to perform rapid prototyping without the need for assembly or molding techniques to form the desired article. However, a fundamental problem associated with such techniques is that the strength of the accordingly manufactured article is often inferior to that of a corresponding article formed using traditional assembly methods. This is because the adhesion between adjoining materials, e.g. layers, fibers and/or grains, can be poor.

For instance, in additive manufacturing techniques based on powder sintering, the printed objects are composed of sintered grains where the neck between grains often exhibits low fracture strength. In additive manufacturing techniques where the grains or fibers are embedded in a matrix such as in ink jet or fiber printers, the adherence of the grains or the fibers to the matrix material might be weak. In the case of Fused Deposition Modelling (FDM) or dispensing techniques, layers of material are deposited on top of each other to produce a structure. It is often the case that at the interface of the layers, in particular when the underlying layer is cold for FDM or not compatible with the layer on top, the adhesion between the layers is weak. Consequently, articles with inferior mechanical properties are obtained. Furthermore, in case of multi-material prints the different printed materials can exhibit poor adhesion. This results in further weakened mechanical properties or even in the impossibility to produce the desired articles.

US 2014/0134335 A1 discloses a process for the production of coated filaments for use in an extrusion 3-D printing process in which filaments are coated with an additive prior to printing to improve inter-layer adhesion. This however alters the composition of the printing material, here filaments, which may be undesirable. It would be desirable to be able to improve such inter-layer adhesion using standard printing materials.

SUMMARY OF THE INVENTION

The present invention seeks to provide a printing head that can improve the adhesion between contacting layers of a printed 3-D article.

The present invention further seeks to provide a printing apparatus including such a printing head.

The present invention yet further seeks to provide a method of printing a 3-D article using such a printing head.

The present invention still further seeks to provide a printed article printed in accordance with such a printing method.

According to an aspect, there is provided a printing head for a 3-D printing apparatus, comprising a nozzle arranged to print a layer of a printing material on a receiving surface. The nozzle comprises an outlet including a texturing member arranged to texture the layer or the receiving surface during printing of said layer by said nozzle. The outlet is shaped to form protrusions extending from a main surface of the layer for interlocking with a subsequent layer. Such a printing head increases the surface area between adjacent layers of an article printed in this manner, which increases the adhesive strength between layers, thereby increasing the overall strength of the article. Furthermore, the surface area of the layer is increased, thereby increasing the adhesion between the layer and a subsequent layer deposited thereon.

The nozzle comprises an outlet including the texturing member such that the nozzle is arranged to deposit a non-planar layer of the printing material, that is, a layer including protrusions such that these protrusions do not have to be formed separately. To this end, the texturing member may provide the outlet with a polygonal outline in order to create the desired protrusions in the layer deposited by the nozzle. The polygonal outline may comprise a plurality of corners having an angle less than 90 degrees. In this way material expelled from the nozzle along such corners is pre-shaped into the protrusions.

In an embodiment the outlet defines a plurality of clamping features arranged to cause the layer of printed material to comprise a plurality of clamping features that clamp a subsequent layer to the layer. In this way a particularly strong adhesion between two adjacent layers is provided.

In an embodiment the printing material has a viscosity such that the bulk of the printing material flows around features of an underlying layer.

In an embodiment, a spraying member is arranged upstream from the nozzle during printing and is arranged to deposit a granular material on the deposited layer in order to increase the surface area of the printed layer. This for instance has the advantage that the actual surface area may be adjusted as a function of the desired adhesion requirements as the deposition rate of the granular material may be varied accordingly. The spraying member advantageously deposits the granular material in a particularly homogeneous manner over the deposited layer.

According to another aspect, there is provided a 3-D printing apparatus comprising the printing head of any of the above embodiments, wherein the apparatus is arranged to laterally move the printing head over a receiving surface. Such a 3-D printing apparatus benefits from the printing head of the present invention by producing 3-D articles that have improved inter-layer strength due to the increased adhesion between adjacent layers due to the increased contact surface area between these layers as created by the texturing member of the printing head.

In a particularly advantageous embodiment, the apparatus is configured to rotate the printing head to facilitate a change in printing direction. This has the advantage that because the printing direction (using the printer head) may be changed, there is no need to return the printer head to a particular starting position in a scenario where the printer head can only move in a single direction due to its fixed orientation. This embodiment therefore improves printing speeds.

According to yet another aspect, there is provided a method of printing an article, comprising depositing a textured layer of a printing material including features protruding from a main surface of the layer on a receiving surface by laterally moving a printing head including a texturing member across the receiving surface. Articles produced by this printing method benefit from increased strength through better inter-layer adhesion as explained above. In addition, as no adjustment of the printing materials used in the method is required, the method may be applied using existing printing materials, thereby facilitating its wide application without requiring adjustment of existing printing processes and apparatuses. Furthermore, this obviates the need for separate manipulation of the layer of which the printing is in progress or of the receiving surface of this layer.

The receiving surface may be a previously deposited layer of a further printing material.

Additionally, the texturing step may comprise depositing a granular material on a portion of the deposited layer. The granular material may comprise granules having a textured surface in order to further increase the effective contact surface area between contacting layers of the article to be printed.

According to still another aspect, there is provided a printed article comprising a stack of layers printed in accordance with any of the embodiment of the aforementioned method. Such a printed article is characterized by the presence of textured interfaces between adjacent layers of the article, giving the printed article increased strength as previously explained.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
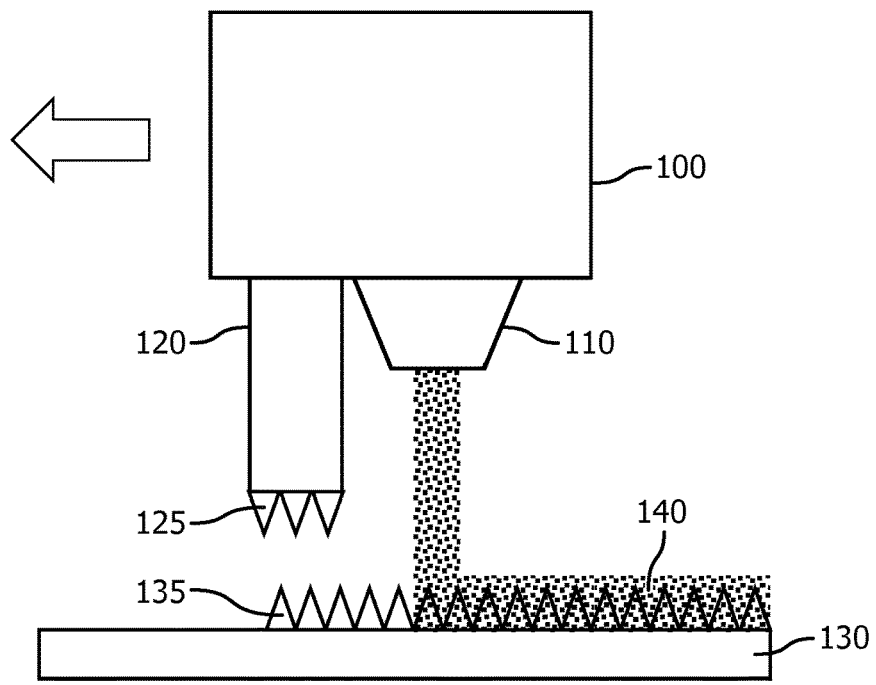
FIG. 1 schematically depicts an aspect of a printing device including a printing head.

It should be understood that the Figures are merely schematic and are not drawn to scale. It should also be understood that the same reference numerals are used throughout the Figures to indicate the same or similar parts unless specifically mentioned otherwise.

Aspects of the present invention are concerned with the provision of printing heads for printing apparatuses for additive manufacturing, from here on referred to as 3-D printing apparatuses. A particular benefit of at least some embodiments of the present invention is that the novel printing heads may be used in conjunction with existing printing apparatuses, e.g. retrofitted thereto, such that the present invention is applicable to any 3-D printing apparatus to which such a printing head can be fitted. Suitable 3-D printing apparatuses include printing apparatuses employing fused deposition modeling or dispensing techniques, printing apparatuses employing powdered sintering techniques, continuous filament fabrication printers, or printing apparatuses employing any other technique in which the article is printed in a layered fashion. Any suitable 3-D apparatus that can be altered by the inclusion of a printing head according to one of embodiments described in more detail below may be considered for the purpose of the present invention. As previously explained, such printing apparatuses typically are controlled by a computer that evaluates a CAD file or the like of the article to be printed and controls the printing head of the printing apparatus in accordance with the performed evaluation. As such computer control using files describing (layers of) the article to be printed is well-known per se, this will not be explained in further detail for the sake of brevity only.

Similarly, the teachings of the present invention may be applied to any suitable printing material, e.g. printing inks and the like that are routinely used in additive manufacturing processes, e.g. printing materials comprising or consisting of (radiation-) curable polymers, pulverized sinterable materials, e.g. thermoplastic polymers or other granular sinterable materials, fibrous materials, which may be embedded in a suitable matrix material, and so on. Any printing material that may be textured in accordance with one or more aspects of the present invention may be contemplated.

In the context of the present invention, where reference is made to the texturing of a surface, this is intended to cover mechanical surface treatments that enhance the surface area of the surface, e.g. mechanical roughening or patterning, as well as intended to cover certain deposition techniques in which the printing material is deposited in such a manner that the resulting deposited layer exhibits protrusions from the upper main surface, i.e. the exposed surface, of the printed layer, which protrusions serve as anchors for a subsequent layer to be printed over the printed layer, thereby interlocking the adjacent layers. FIG. 1 schematically depicts a printing head 100 comprising a nozzle 110 for depositing a layer 140 of a printing material on a receiving surface 130, for instance a previously printed layer of a further printing material, which may be a different material to the printing material or maybe the same material. The printing head 100 further comprises a texturing member 120 that is laterally displaced relative to the nozzle 110 and that is typically located such that during printing, in which the printing head 100 is typically moved along the receiving surface 130 in a direction indicated by the block arrow, the texturing member is located upstream to the nozzle 110 such that the texturing member 120 can be brought into contact with a portion of the receiving surface 130 prior to the printing material being deposited on that portion by the nozzle 110.

The texturing member 120 typically comprises a plurality of edges 125, preferably sharp edges such as tooth-shaped edges that when brought into contact with the receiving surface 130 roughen the receiving surface 130, thereby increasing the contact area between the receiving surface 130 and the printing material 140 to be deposited thereon. This is schematically indicated in FIG. 1 by the texturing 135 on the receiving surface 130, which texturing has been caused by the contact between the texturing member 120 and the receiving surface 130.

The edges 125 of the texturing member 120 may be brought into permanent contact with the receiving surface 130 during printing of the layer 140, such that the edges 125 are dragged over the receiving surface 130 when the printing head 100 is displaced relative to the receiving surface 130 as indicated by the block arrow. In this manner, the edges 125 may form trenches in the receiving surface 130 to be filled by the printing material deposited by the nozzle 110 in case of stationary edges 125. Alternatively, the texturing member 120 may include a rotating head comprising the edges 125 if a non-linear textured pattern is desirable. The rotating head may be rotated at different speeds during the printing process in case a randomized textured pattern is desirable.

Figure 6:
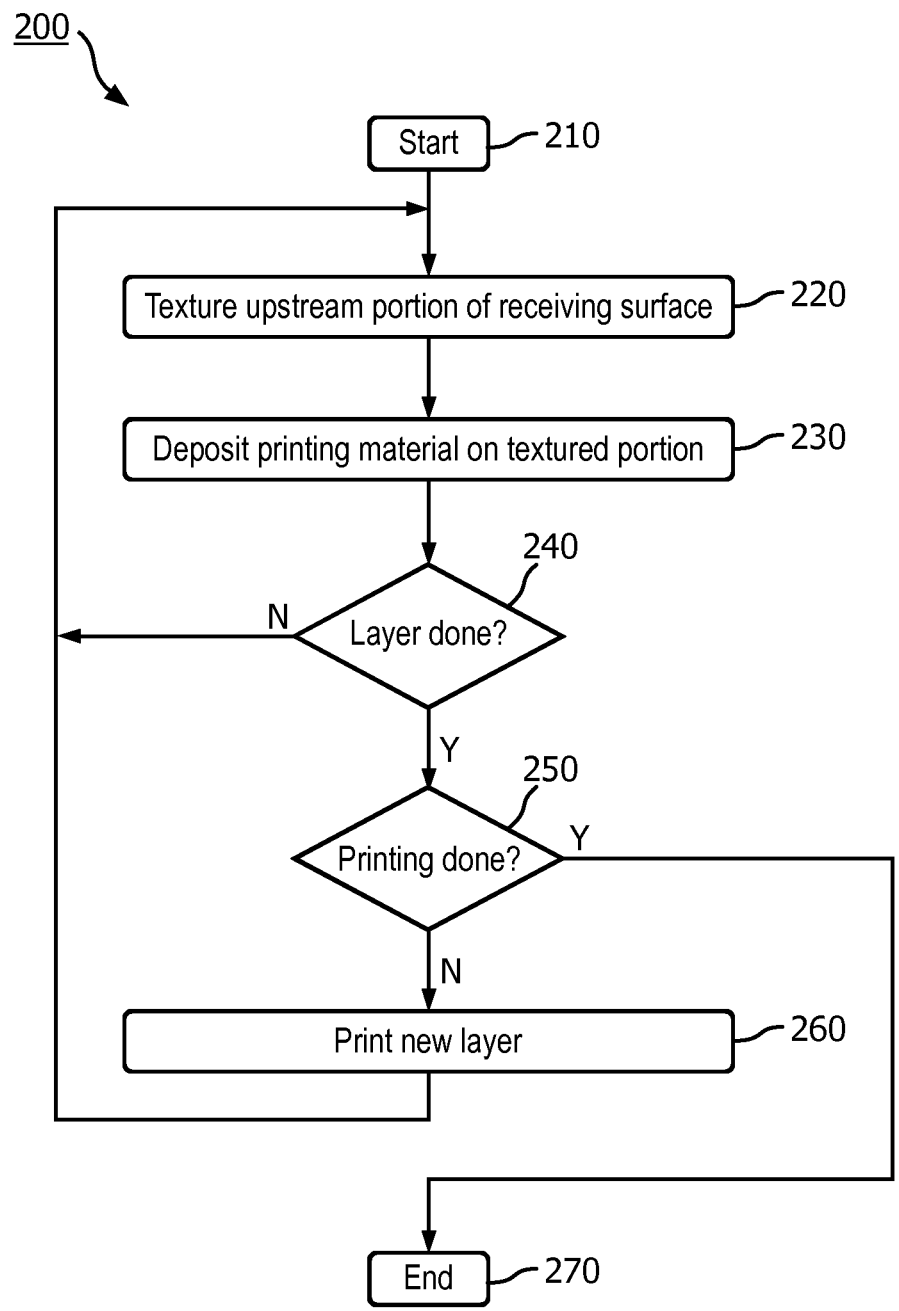
FIG. 6 is a flow chart of a printing method.

A 3-D printing apparatus comprising the printing head 100 as shown in FIG. 1 and as described above may implement a printing method 200 as schematically depicted by the flowchart of FIG. 6. The method 200 starts in step 210, in which the printing process is initiated, which as explained above may include the evaluation of a computer file describing the various layers of the article to be printed by the printing apparatus. During printing of one of the layers of the article, the method performs step 220, in which an upstream portion of the receiving surface 130 is textured by the texturing member 120, simultaneous with step 230 in which the nozzle 110 deposits the printing material on a textured portion of the receiving surface 130. In other words, the texturing step 220 is separated in space but not in time from the depositing step 230 as texturing and deposition occurs simultaneously in different locations on the receiving surface 130.

Next, it is checked in step 240 if the printing of the layer 140 has been completed. If this is not the case, the method returns to steps 220 and 230 in which subsequent portions of the receiving substrate 130 are textured and printed on as previously explained. Once it is determined in step 240 that the printing of a layer 140 has been completed, the method proceeds to step 250 in which it is checked if a further layer of the article needs printing. If this is the case, the method proceeds to step 260 in which the printing of the new layer is initiated, e.g. by moving the printing head 100 to the appropriate initial position of the previously printed layer 140 as specified by a control unit of the 3-D printing apparatus, e.g. a computer controlling the printing process in accordance with a CAD file or the like as previously explained. After the printing of the next layer has been initiated in this manner, the method may return to step 220 and 230 as previously explained. If on the other hand it is decided in step 250 that no further layers need printing, the method proceeds to step 270 in which the printing process is terminated.

Figure 2:
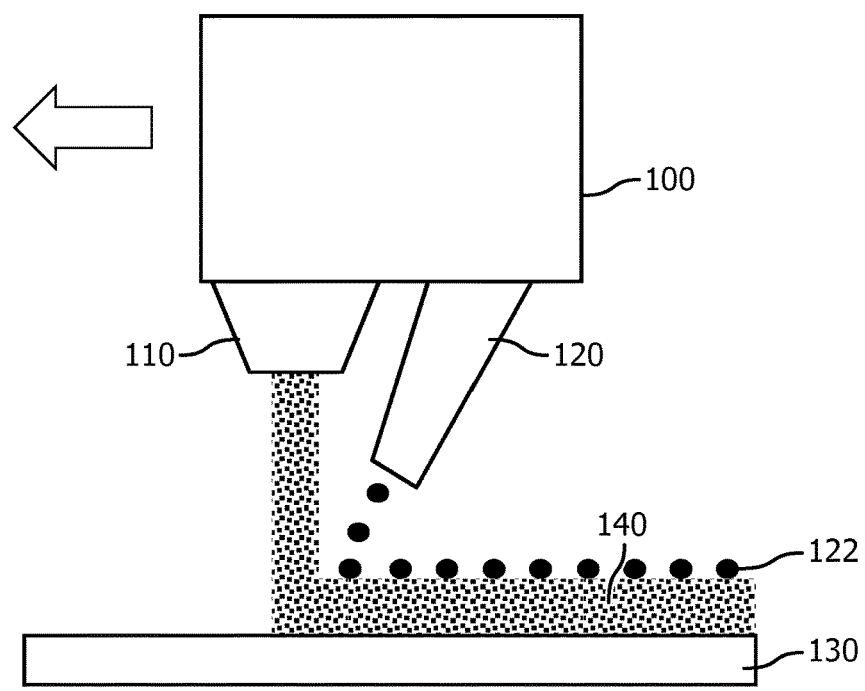
FIG. 2 schematically depicts an aspect of a printing device including a printing head according to an embodiment.

An embodiment of a printing head 100 is schematically depicted in FIG. 2. In this embodiment, the printing head 100 in addition to the nozzle 110 comprises a texturing member 120 that is laterally displaced relative to the nozzle 110 such that it is located in a downstream position relative to the nozzle 110 when the printing head 100 is displaced over the receiving surface 130 by the 3-D printing apparatus in the direction as indicated by the block arrow. In other words, the texturing member 120 is arranged to texture a portion of the layer 140 deposited by the nozzle 110. The texturing member 120 is a spraying member that sprays the granular material 122 on the layer 140, thereby achieving a homogeneous spread of the granular material 122 on the layer 140.

As shown in FIG. 2, the texturing member 120 is arranged to deposit a granular material 122 on the freshly deposited layer 140 of the printing material, thereby increasing the roughness, i.e. contact surface area, of the layer 140. Any suitable granular material 122 may be considered for this purpose, e.g. metal particles, silica particles, glass particles and so on. The granular material may be dispersed in a liquid to facilitate its deposition. Preferably, a liquid with a boiling temperature not exceeding 100° C. such as water, alcohols, and so on, is used for this purpose such that the liquid may be readily evaporated after deposition. A dispersing agent optionally may also be present in order to disperse the granular material in the liquid where necessary. Suitable dispersing agents are well-known per se such that it suffices to state that any suitable dispersing agent may be used.

In an embodiment, the granular material 122 may have a textured surface in order to increase the surface area of the granular material, thus further increasing the surface roughness of the layer 140. The granular material may be textured in any suitable manner, e.g. mechanical texturing. Such (mechanically) textured granular materials may also improve the adhesion between grains to be sintered after deposition of the layer 140 or improve the adhesion of grains to a matrix material, which makes this option particularly suitable for 3-D printing apparatus employing laser or electron beam powder sintering techniques or inkjet techniques.

As shown in FIG. 2, the texturing member 120 may be oriented such that the granular material 122 is deposited under a non-perpendicular angle with the layer 140 in order to reduce the force of impact of the granular material 122 with the layer 140, thereby ensuring that the granular material 122 remains on the surface of the layer 140. However, it will be immediately understood by the skilled person that instead of this non-perpendicular orientation of the texturing member 120, the same effect may be achieved by adjusting, e.g. reducing, the distance between the outlet of the texturing member 120 and the layer 140. The non-perpendicular orientation of the texturing member 120 may advantageously achieve a homogeneous spread of the granular material 122 over the layer 140.

Figure 7:
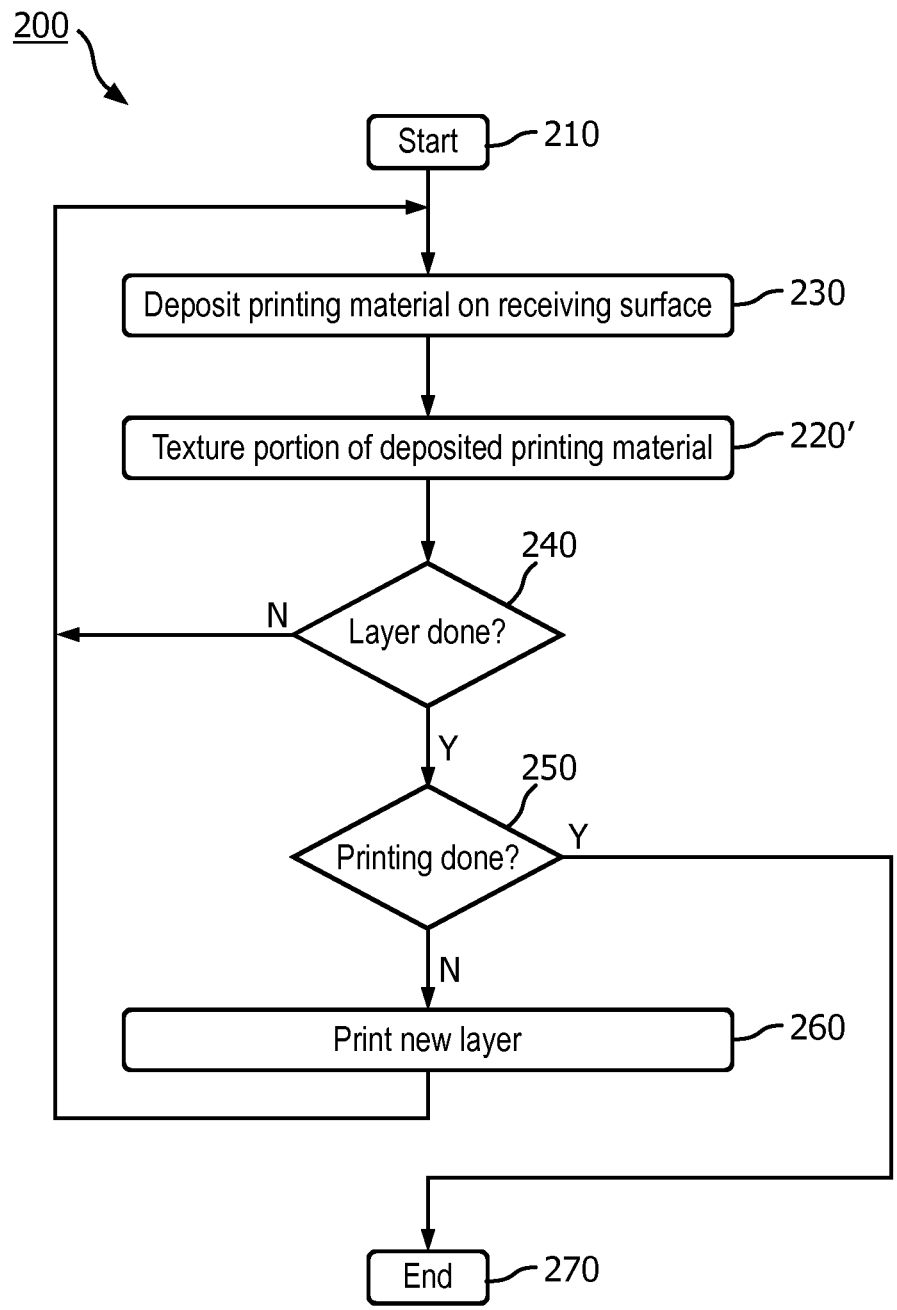
FIG. 7 is a flow chart of a printing method according to an embodiment.

A 3-D printing apparatus comprising the printing head 100 as shown in FIG. 2 and as described above may implement a printing method 200 as schematically depicted by the flowchart of FIG. 7. The printing method 200 of FIG. 7 differs from the printing method 200 of FIG. 6 in that step 220 is replaced by step 220', in which the surface texturing is achieved by the deposition of the granular material 122 on a portion of the layer 140 printed in step 230 as explained in more detail above. In FIG. 7, the order of steps 220' and 230 has been reversed compared to FIG. 6 because step 220' is now performed downstream to the deposition step 230, i.e. is performed on a portion of the layer 140 already deposited. In other words, the texturing step 220' is separated in space but not in time from the depositing step 230 as texturing and deposition occurs simultaneously in different locations on the receiving surface 130.

Figure 3:
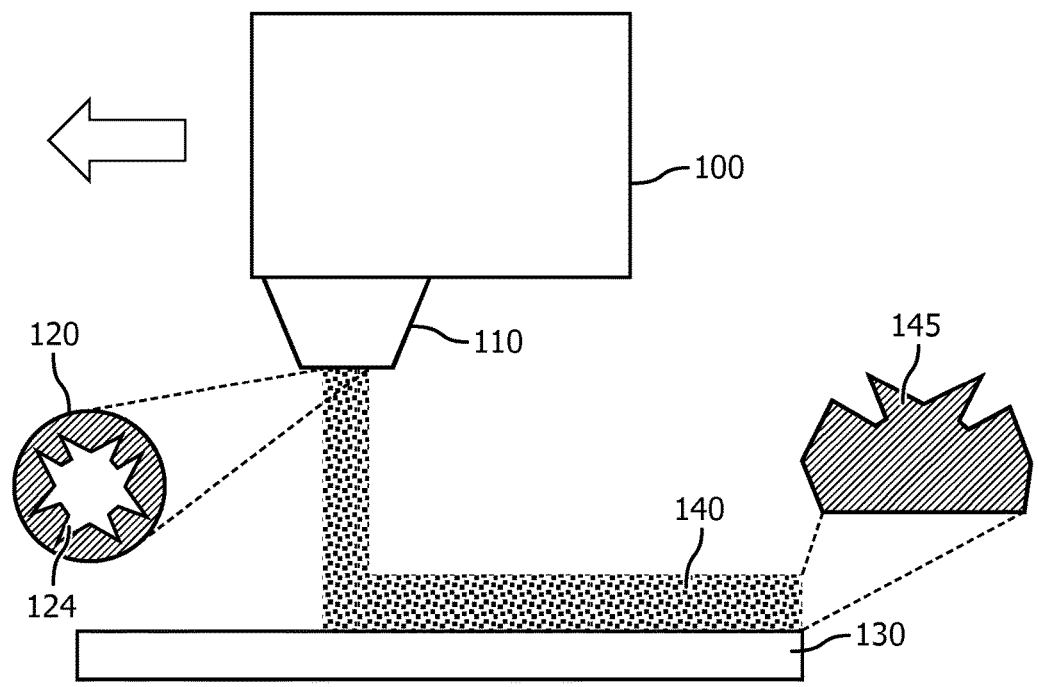
FIG. 3 schematically depicts an aspect of a printing device including a printing head according to another embodiment.

FIG. 3 schematically depicts a printing head 100 according to the invention, in which the texturing member 120 is integrated in the nozzle 110. In this embodiment, the texturing member 120 defines an outlet of the nozzle 110 which is shaped such that the layer 140 deposited by the nozzle 110 on the receiving surface 130 is intrinsically irregular or textured. The right-hand inset in FIG. 3 schematically depicts an example cross-section of the layer 140 produced by the nozzle 110 of the printing head 100 as shown in FIG. 3, in which the layer 140 comprises protrusions 145, e.g. spikes or the like, extending from the main surface of the layer 140. The protrusions 145 act as anchors for a subsequent layer to be deposited onto the layer 140, such that the subsequent layer flows around the protrusions 145, thereby creating a pair of interlocked layers.

Figure 4:
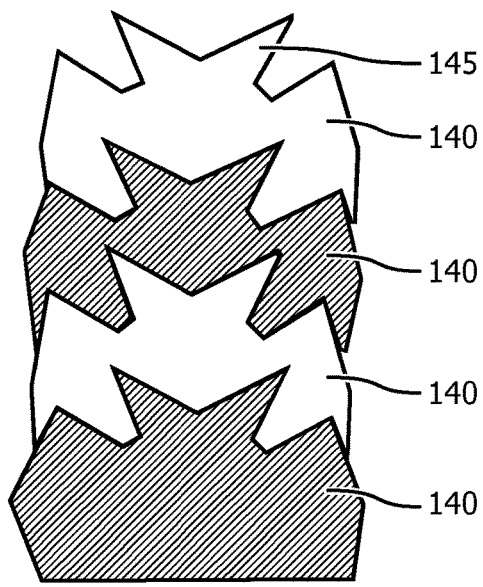
FIG. 4 schematically depicts a printed article obtained using the printing device of FIG. 3.

FIG. 4 schematically depicts a plurality of layers 140 that may be formed in this manner, in which the protrusions 145 of a lower layer 140 engage with receiving portions of an upper layer 140 in an interlocking manner, thereby preventing the easy separation of adjacent layers, such that an article printed in this manner exhibits excellent strength due to the interlocking nature of adjacent layers of the layer stack forming the article.

Upon returning to FIG. 3, in an embodiment the texturing member 120 may define a nozzle outlet having a polygonal outline 124 in order to create the textured layer 140, as schematically depicted in the left-hand inset of FIG. 3. Any suitable polygonal outline 124 may be used for this purpose, e.g. a polygonal outline comprising a plurality of sharp corners, i.e. corners having an angle of less than 90° such that printing material expelled from the nozzle 110 along such corners is pre-shaped into the protrusions 145. The printing material preferably has a viscosity such that the bulk of the printing material may flow around features in an underlying layer, e.g. protrusions 145 of a previously printed layer of a 3-D article, but wherein the protrusions 145 generally remain their overall shape for long enough to solidify the layer 140, e.g. by curing, drying and so on. The embodiment of the printing head 100 shown in FIG. 3 is particularly suitable for use in printing processes such as FDM and other dispensing techniques although it will be understood by the skilled person that is embodiments may equally be used in a 3-D printing apparatuses employing other printing techniques.

Figure 5:
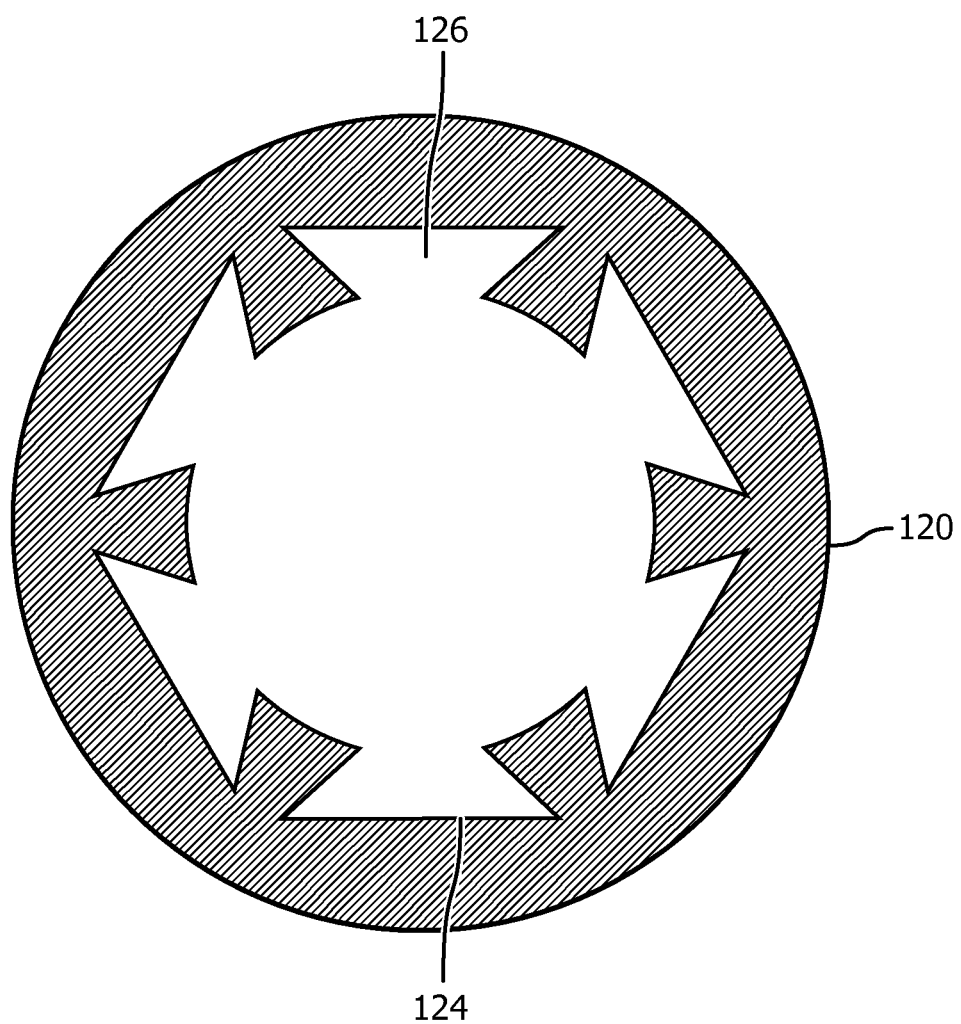
FIG. 5 schematically depicts an aspect of a printing device including a printing head according to yet another embodiment.

Another example embodiment of such a texturing member 120 to be used as a nozzle outlet is schematically shown in FIG. 5. In this embodiment, the polygonal outline 124 of the nozzle outlet defines a plurality of clamping features 126 that cause the textured layer 140 to comprise a plurality of clamping structures 126 that clamp the subsequently printed layer to the textured layer 140, thereby forming a particularly strong adhesion between the two adjacent layers. Other suitable outlines of such a nozzle outlet to enhance such an adhesion will be apparent to the skilled person.

In an embodiment, the printing head 100 may additionally include the texturing member 120 of FIG. 2, i.e. a spraying member arranged to deposit a granular material 122 on the freshly deposited layer 140 as well as the texturing member providing a non-planar layer including protrusions as described in relation to FIGS. 3, 4 and 5, which further increases the adhesion between of adjacent layers of an article printed in this manner.

In an embodiment, the texturing member 120 may be movably mounted on the printing head 100 such that the texturing member 120 may be periodically brought into contact with the receiving surface 130, e.g. in a stamping manner or the like, in case it is desirable to reduce the resistance between the printing head 100 and the receiving surface 130 during the printing process of the layer 140. This may be combined with the texturing member 120 comprising a rotating head as previously explained, in which a texturing member for instance may be operated by permanently rotating the head comprising the edges 125 or only rotating the head when brought into contact with the receiving surface 130.

The previously printed layer of a further printing material may be a different material to the printing material. These materials may differ in terms of refractive index or color or combinations thereof. For example, the previously printed of a further printing material may be highly reflective, while the printing material is (partially) transparent. In another embodiment, the previously printed of a further printing material has a high refractive index, while the printing material has a lower refractive index. Such combinations might be interesting for applications where light reflection, transmission, refraction or diffraction is needed e.g. in lighting applications.

Figure 8:
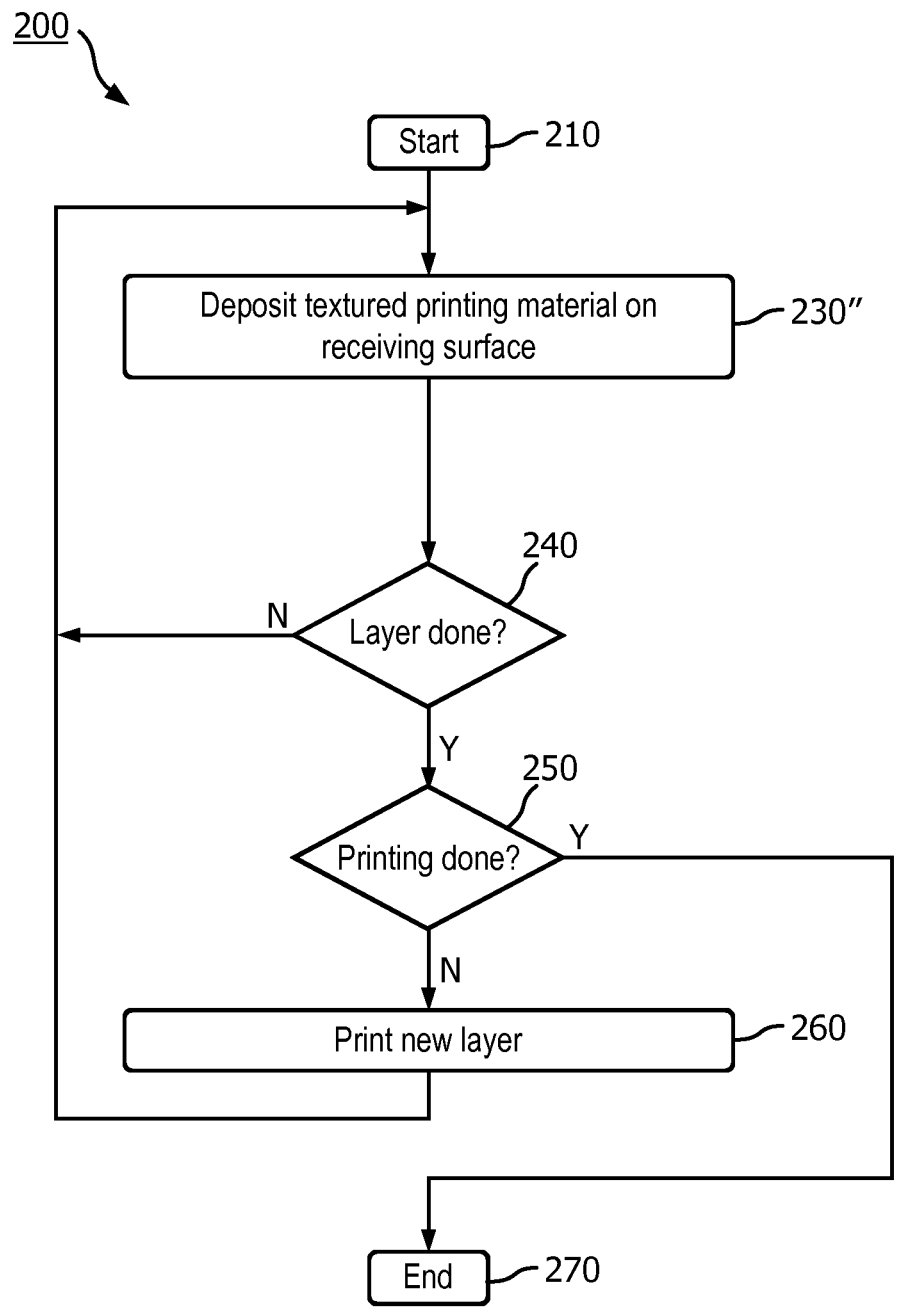
FIG. 8 is a flow chart of a printing method according to another embodiment.

A 3-D printing apparatus comprising the printing head 100 as shown in FIG. 3 and as described above may implement a printing method 200 as schematically depicted by the flowchart of FIG. 8. The printing method 200 of FIG. 8 differs from the printing method 200 of FIG. 6 in that steps 220 and 230 are replaced by a single step 230", in which the surface texturing is achieved by depositing a textured layer 140 of the receiving substrate 130 as explained in more detail above. In other words, dispensing step and texturing step are performed simultaneously in a combined step wherein the printing material is dispensed in a textured manner onto the receiving substrate 130.

In the foregoing embodiments of the 3-D printing apparatus, the printing head 100 may be rotatably mounted, e.g. reversibly mounted, such that when a particular region of a receiving surface 130 has been printed in a particular direction, the orientation of the printing head may be adjusted such that the printing process may be continued in a different direction, e.g. the reverse direction. This obviates the need to having to return the printing head 100 to a predetermined starting position from which all regions of the receiving surface 130 are printed in the same (single) direction as is the case when having a printer head 100 mounted in a fixed orientation to maintain the required orientation of the texturing member 120 relative to the printing direction.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A printing head for a 3-D printing apparatus, comprising:
   a nozzle arranged to print a layer of a printing material on a receiving surface, the nozzle comprising an outlet including a texturing member arranged to texture the layer during printing of the layer, the texturing member shaped to form protrusions extending from a main surface of the layer for interlocking with a subsequent layer,
   wherein the texturing member defines the outlet to have a polygonal outline comprising a plurality of corners having an angle less than 90 degrees.

2. The printing head of claim 1, wherein the outlet defines a plurality of clamping features arranged to cause the layer of printing material to comprise a plurality of clamping structures that clamp the subsequent layer to the layer of printing material.

3. The printing head of claim 1, further comprising a spraying member laterally displaced from the nozzle and arranged to deposit a granular material.

4. The printing head of claim 3, wherein the spraying member is arranged downstream from the nozzle to deposit the granular material on the layer of printing material.

5. The printing head of claim 3, wherein the spraying member is arranged upstream from the nozzle to deposit the granular material on a previously printed layer of printing material.

6. The printing head of claim 3, wherein the spraying member is oriented such that the granular material is deposited under a non-perpendicular angle with respect to the layer of printing material.

7. A 3-D printing apparatus comprising the printing head of claim 1, wherein the apparatus is arranged to laterally move the printing head over the receiving surface.

8. The 3-D printing apparatus of claim 7, wherein the apparatus is configured to rotate the printing head to facilitate a change in printing direction.

9. A method of printing an article, comprising:
   depositing a textured layer of a printing material on a receiving surface, the textured layer including features protruding from a main surface of the textured layer for interlocking with a subsequent layer, wherein depositing the textured layer comprises laterally moving a printing head including a nozzle and a texturing member across the receiving surface, the nozzle comprising an outlet shaped to form the features for interlocking with the subsequent layer; and
   depositing the subsequent layer on the receiving surface, wherein the subsequent layer interlocks with the features protruding from the main surface of the textured layer,
   wherein the texturing member defines the outlet to have a polygonal outline comprising a plurality of corners having an angle less than 90 degrees.

10. The method of claim 9, wherein the receiving surface is a previously deposited layer of a further printing material.

11. The method of claim 9, further comprising depositing a granular material on a portion of the deposited layer.

12. The method of claim 11, wherein the granular material comprises metal particles, silica particles, or glass particles.

13. The method of claim 12, wherein the granular material is dispersed in a liquid to facilitate its deposition, the liquid having a boiling temperature not exceeding 100 degrees Celsius.

14. The method of claim 9, wherein the printing material has a viscosity such that the bulk of the printing material flows around features of an underlying layer after depositing the textured layer of printing material and further comprising the step of solidifying the printing material.

15. The method of claim 9, further comprising depositing a granular material on a previously deposited layer.

16. The method of claim 9, wherein the subsequent layer is of a printing material different from the printing material of the textured layer.

17. The method of claim 11, wherein the granular material is deposited on the portion of the deposited layer at a non-perpendicular angle with the deposited layer.

18. A printed article comprising a stack of layers printed in accordance with the method of claim 9.

* * * * *